Patented Feb. 11, 1947

2,415,800

UNITED STATES PATENT OFFICE 2,415,800

CONTROLLED OXIDATION OF ALKYLATED AROMATIC HYDROCARBONS

Frederick F. Rust and William E. Vaughan, Berkeley, Calif., assignors to Shell Development Company, San Francisco, Calif., a corporation of Delaware No Drawing. Application March 12, 1945, Serial No. 582,416

9 Claims. (Cl. 260—524)

This invention relates to the controlled non-explosive oxidation of alkylated aromatic hydrocarbons, and more particularly pertains to the catalytically controlled oxidation of normally liquid aromatic hydrocarbons to produce high yields of predetermined phenolic compounds, carboxylic acids, ketones and/or organic peroxides. This application is a continuation in part of the copending application Serial No. 474,221, filed January 30, 1943.

The oxidation of various hydrocarbons has been effected for a number of years both non-catalytically and in the presence of various catalysts. As a general rule, most if not all of these oxidations resulted in considerable decomposition of the hydrocarbons, i. e. cleavage of the carbon-to-carbon bonds of the starting organic material. Also, the products of reaction of such oxidations contain various percentages of hydrocarbons which have been oxidized to a greater or lesser extent. For instance, the catalytic oxidation of paraffinic hydrocarbons in accordance with the teachings of the prior art formed mixtures containing various percentages of carbon monoxide, carbon dioxide, olefins, water and some aldehydes, alcohols, acids, acetals, esters, ketones and other hydrocarbon-oxygen compounds. Similarly, the catalytic oxidation of alkylated aromatic hydrocarbons, e. g. toluene, in accordance with the teachings of the prior art frequently formed mixtures containing various percentages of saturated and unsaturated hydrocarbon, saturated and unsaturated aliphatic and aromatic aldehydes, ketones, lactones, alcohols and other oxygenated compounds, e. g. carbonic acid. These various oxygenated compounds formed during the oxidation of different hydrocarbons according to the teachings of the prior art usually contained varied numbers of carbon atoms per molecule due to excessive carbon-to-carbon scission, as well as to other side reactions. Although most of the oxygenated organic compounds thus formed are generally more valuable than the primary materials, the subsequent fractionations of the reaction mixtures and the separate recovery of the individual compounds therefrom are frequently very difficult, if not commercially impossible, or at least greatly increase the cost of the final product or products.

It is frequently desirable to obtain predominantly phenolic compounds, carboxylic acids, peroxides and/or ketones rather than mixtures containing them and large amounts of other aldehydes, alcohols, lactones and the like. In all such cases the known methods of partial oxidation of hydrocarbons, whether they be catalytic or non-catalytic, are uneconomical because of the partial or complete decomposition of the starting materials to form carbon and compounds containing fewer carbon atoms per molecule, as well as due to the formation of mixtures of compounds which are oxygenated to a greater or lesser degree.

It is therefore the main object of the present invention to avoid the above and other defects and to provide a novel process whereby high yields of predetermined oxygenated organic compounds may be attained. A further object of the invention is to provide a process for the production of high yields of phenolic compounds, carboxylic acids, ketones or organic peroxides with a minimum formation of other oxygenated organic compounds. Another object is to provide a novel process for the catalytic oxidation of toluene to produce high yields of benzoic acid without substantial conversion of the primary material to oxygenated products. Still another object is to provide a novel process for the controlled catalytic oxidation of alkylated aromatic hydrocarbons, i. e. aromatic hydrocarbons containing one or more alkyl side chains, and particularly of the normally liquid alkylated aromatic hydrocarbons, to form certain ketones, phenolic compounds and/or carboxylic acids while avoiding any material formation of other oxygenated compounds, including those having a lesser number of carbon atoms per molecule. The term ketone as employed herein and in the appended claims refers to organic compounds having one or more ketonic carbonyl groups and therefore includes diketones.

It has now been discovered that the above and other objects may be attained by effecting the partial and controlled oxidation in the presence of hydrogen bromide employed as a catalyst. More specifically stated, the invention resides in the controlled non-explosive oxidation of alkylated aromatic hydrocarbons, and particularly of the normally liquid alkylated aromatic hydrocarbons, in the presence of a catalyst consisting of or comprising hydrogen bromide or a compound capable of yielding hydrogen bromide under the operating conditions. In one of its more specific embodiments, the invention resides in the production of phenolic compounds, carboxylic acids, peroxides and/or ketones (including polyketones) by the controlled oxidation of alkylated aromatic hydrocarbons, this oxidation being effected by subjecting the alkylated aromatic hydrocarbons to the action of oxygen, an oxygen-containing material or an oxygen-yielding material in the presence of hydrogen bromide or a substance capable of yielding hydrogen bromide under the operating conditions and at temperatures and pressures below those capable of causing spontaneous combustion.

The above-outlined invention is predicated on the discovery that the presence of hydrogen bromide during the oxidation of the above-outlined and hereinbelow more fully described alkylated aromatic hydrocarbons controls the oxidation reaction so that oxidation occurs on the carbon atom or atoms to which a halogen atom would normally attach itself if the starting material were subjected to a halo-substitution reaction. Furthermore, it has been found that the presence of hydrogen bromide, besides retarding the explosive or complete combustion of the organic starting material, has the effect of inhibiting decomposition of the carbon structure of such organic starting materials.

The process of the present invention is applicable to the controlled oxidation of any alkylated aromatic hydrocarbon. The following is a representative list of such alkylated aromatic hydrocarbons which may be oxidized in accordance with the present process: toluene, xylenes, ethyl benzene, hemi-mellitene, pseudocumene, mesitylene, n-propyl benzene, cumene, cymene, durent, isodurene, prehnitene, diethylbenzenes, triethylbenzenes, sym.-tetraethylbenzene, tertiary butyl benzene, diphenyl methane, diphenyl ethane, monomethyl naphthalenes, and the like, and their homologs. The lower homologs of the alkylated aromatic hydrocarbons are particularly suitable as the organic starting materials. However, generally speaking, although the invention is particularly adapted to the controlled oxidation of the normally liquid alkylated aromatic hydrocarbons (which may contain one or more rings in the nucleus), even the normally solid alkylated aromatic hydrocarbons may be oxidized in accordance with the process of the present invention. A suitable subclass of such alkylated aromatic hydrocarbons comprises the alkylated aromatic hydrocarbons, i. e. aralkyl compounds in which the aryl radical is directly attached to a tertiary carbon atom. Representative examples of this group of alkylated aromatic hydrocarbons are cumene, secondary butylbenzene, and the like, and their homologs, as well as compounds in which the aromatic radical attached to the tertiary carbon atom of the alkyl radical in turn carries one or more other alkyl radicals, e. g. methyl, ethyl, etc. radicals. In some instances mixtures of the above and like alkylated aromatic hydrocarbons may be employed as the organic starting materials.

The non-explosive controlled oxidation of the above-outlined class of alkylated aromatic hydrocarbons is effected in accordance with the present invention at elevated temperatures below those at which spontaneous combustion or substantial decomposition of the carbon structure occurs. This upper temperature limit will at least in part depend on the specific hydrocarbon treated as well as on the proportions thereof and of the oxygen and hydrogen bromide present in the vaporous mixture subjected to the elevated temperatures. Generally speaking, this upper temperature limit is in the neighborhood of about 225° C. to about 250° C. However, some of the more stable alkylated aromatic hydrocarbons may be heated together with oxygen and hydrogen bromide to higher temperatures, e. g. about 275° C. and higher, particularly in the presence of inert diluents, without causing the mixture to decompose with the concurrent formation of high yields of carbon. Also, with shorter contact periods the reaction temperature may be raised above the mentioned limits. However, excessively high temperatures, even though they are below the explosive region, should be avoided because of certain undesirable side reaction such as excessive conversion of hydrogen bromide to organic bromides. Although this in itself is not detrimental since the organic bromides themselves may be treated in accordance with the present invention to form, for example, carboxylic acids and hydrogen bromide (so that in effect at least a portion of the hydrogen bromide is regenerated and may be re-used) the excessive formation of organic bromides during the controlled oxidation of a given alkylated aromatic hydrocarbon is undesirable because this decreases the catalyst concentration and therefore may affect detrimentally the yield or output of the desired oxygenated product or products. Some of the more readily oxidizable compounds of the class defined herein may be economically oxidized according to the present process at temperatures lower than those set forth above, e. g. between about 150° C. and about 175° C. With a further decrease in the operating temperatures the output of products per unit time will decrease so that at temperatures of below about 100° C. the controlled oxidation in the presence of hydrogen bromide may become uneconomical.

The reaction may be effected in the liquid, vapor or mixed phase. Since it is difficult to maintain a desirable relatively high oxygen concentration when the reaction is conducted in the liquid phase, it is generally preferable to effect the oxidation according to the present invention in the vapor phase. Since some of the relatively higher-boiling alkylated aromatic hydrocarbons cannot be effectively maintained in the vapor phase and in contact with sufficient concentrations of oxygen and of hydrogen bromide without causing spontaneous combustion, the oxidation of such compounds may be readily effected in the presence of inert diluents, such as steam, nitrogen, carbon dioxide, and even methane, which latter is relatively stable at temperatures at which the alkylated aromatic hydrocarbons may be oxidized according to the invention. Of the diluents, the use of steam is believed to be most advantageous because the hydrogen bromide may then be removed from the reaction mixture as an overhead fraction in the form of its constant boiling mixture of hydrogen bromide and water. In some instances, and particularly with the relatively higher-boiling alkylated aromatic hydrocarbons, the oxidation in accordance with the present invention may be effected in the liquid phase. This permits the treatment of even the normally solid alkylated aromatic hydrocarbons which in some instances may be employed in solution in inert solvents.

Although the volumetric ratios of the organic starting material to the oxygen may vary within relatively wide limits, it may be stated that satisfactory yields of the desired oxygenated product or products can be obtained by using stoichiometric amounts thereof. An increase in the ratio of oxygen to organic material in the treated mixture may increase the yield of the desired phenolic compounds, carboxylic acids and/or ketones. However, any undue increase in this ratio is generally dangerous because of excessive explosion hazards. On the other hand, the use of oxygen-to-hydrocarbon ratios which are considerably below equivolumetric will lower the output of the desired product per unit time because of the presence of less oxygen per unit of space. This renders the process less economical, although operable. In fact, a lowering of the oxygen-to-hydrocarbon ratio may cause a faster consumption of oxygen per unit time. As stated, satisfactory yields of the desired oxygenated products may be obtained when stoichiometric amounts of oxygen and alkylated aromatic hydrocarbon are subjected to the action of hydrogen bromide at the specified operating temperatures. Such mixtures usually present no hazards as far as explosions are concerned, since the hydrogen bromide apparently acts as an explosion retardant or inhibitor.

The amount of hydrogen bromide employed as the catalyst may also vary within relatively wide limits, although optimum amounts or percentages may readily be determined for each individual starting material and for the specific operating conditions employed. Generally, the percentage of oxygen which will react to form the oxygented products will vary with the change in the hydrogen bromide concentration in the mixture subjected to treatment. When the hydrogen bromide concentration is varied from 0 to about 20%, there is a proportional and noticeable change in the percentage of oxygen which reacts with the organic starting material. However, further increase in the volumetric or mole concentration of the hydrogen bromide above 20% does not have such a marked effect on the percentage of oxygen which will react. Very high hydrogen bromide concentrations will cause excessive dilution and this decreases the output of the desired product(s). Such high concentrations should therefore be avoided for economic reasons.

The oxidation in accordance with the present process may be effected at atmospheric pressures, although higher or lower pressures may also be employed. In fact, it is generally preferable to employ superatmospheric pressures because more of the mixture subjected to treatment may be conveyed through a given unit of reaction space per unit time.

The invention may be executed in a batch, intermittent or continuous manner. When operating in a continuous system all of the reactants, as well as the diluents (if such are used), and the catalyst may be first mixed together and the mixture may then be conveyed through the whole length of the reaction zone. Alternatively, it is possible to introduce at least a portion of the catalyst and/or of one or both reactants, i. e. oxygen and the alkylated aromatic hydrocarbon, at various intermediate points along the reaction zone. Such operation may frequently be desirable for purposes of controlling the operating conditions in the reaction zone. Generally, the contact time may vary within relatively wide limits and is at least in part dependent on the other operating conditions, such as the specific alkylated aromatic hydrocarbon treated, the ratios thereof to the oxygen and/or the catalyst, the presence or absence of inert diluents or solvents, the operating conditions and pressures, etc. In a continuous system it has been found that satisfactory yields of the desired phenolic compounds, carboxylic acids and/or ketones may be obtained with contact periods of between about 1 and about 3 to 6 minutes, although shorter or longer contact times may also be employed.

Instead of using pure or substantially pure oxygen for the oxidation in accordance with the process of the invention it is also possible to employ oxygen-containing mixtures such as air, or even substances capable of yielding molecular oxygen under the operating conditions. Also, although the examples presented below are specific to the use of hydrogen bromide as the catalyst, the process of the present invention may be realized by using substances capable of yielding hydrogen bromide under the operating conditions employed.

The following detailed examples are given for purposes of illustrating the present process and the advantages derived therefrom. It is to be understood, however, that the invention is not to be considered as being limited by the specific modes or conditions of operation disclosed, or to the specific reactants employed.

*Example I*

The reactor consisted of a Pyrex glass coil having a volume of 450 cc. A vaporous mixture consisting of toluene, oxygen, nitrogen and hydrogen bromide was conveyed through the reactor at the rate of 30 cc. per minute each of toluene vapor, oxygen and nitrogen, and 15 cc. per minute of hydrogen bromide. The reaction was effected at substantially atmospheric pressure and at a temperature of about 201° C., the nitrogen being employed as a diluent and carrier to maintain the toluene in the vapor state while being introduced into the reaction zone. The residence time was about three minutes. Under these operating conditions, the yield of benzoic acid was equal to about 91.3% as calculated on the oxygen consumed. Approximately 55% of the hydrogen bromide was recovered as such.

*Example II*

A vaporous mixture consisting of toluene, oxygen and hydrogen bromide was conveyed through a Pyrex glass reaction coil at such a rate that the residence time of the reactants in the reaction zone was about three minutes. The rates of input of the mentioned substances were as follows: oxygen, 262 cc./min.; toluene, 277 cc./min.; and hydrogen bromide, 131 cc./min. The reaction was effected at substantially atmospheric pressure and at a temperature of between about 195° C. and 199° C. Under these operating conditions the yield of benzoic acid was about 47% as calculated on the oxygen consumed. Also, about 44% of the introduced oxygen and about 45% of the introduced toluene were consumed or converted per pass through the reaction zone. Approximately 63% of the hydrogen bromide was recovered as such.

*Example III*

The reactor described in Example I was employed. A preheated vaporous mixture consisting of 2 parts by volume of ethyl benzene, 2 parts of oxygen, 2 parts of nitrogen and 1 part by volume of hydrogen bromide was conveyed through this reactor at substantially atmospheric pressure and at such a rate that the residence time was about three minutes. The temperature in the coil was maintained at about 195° C. An analysis of the reaction mixture showed that only minor amounts of carbon monoxide and carbon dioxide were formed. Approximately 8% of acetophenone, 12% of carboxylic acids, and between about 40% and 45% of phenolic compounds were recovered. Better yields of these products may be obtained by a rapid neutralization of effluent products with sodium carbonate, sodium hydroxide, or the like, substantially as soon as the reaction mixture leaves the reaction zone.

*Example IV*

A vaporous mixture consisting of about 2 parts by volume of ethyl benzene, 2 parts by volume of oxygen, and one part by volume of hydrogen bromide was conveyed through a Pyrex glass coil at substantially atmospheric pressure and at such a rate that the residence time was about three minutes. The temperature in the coil was maintained at about 195° C. An analysis of the reaction mixture leaving the reactor showed that the yield of acetophenone was about 15.5% as calculated on the ethyl benzene consumed. Approximately 59% of the hydrogen bromide was recovered as such. The consumptions of oxygen and ethyl benzene were 74% and 66% respectively. Better yields of acetophenone may be obtained by a rapid neutralization of the effluent products substantially as soon as the reaction mixture leaves the reaction zone. Such rapid neutralization will increase the recoverable yield of acetophenone, which latter polymerizes when in the presence of hydrogen bromide.

*Example V*

A vaporous mixture consisting of approximately 2 parts by volume of cumene, 2 parts by volume of oxygen and one part by volume of hydrogen bromide was conveyed through a Pyrex glass coil at substantially atmospheric pressure and at such a rate that the residence time was about 3 minutes. The temperature in the coil was maintained at about 195° C. An analysis of the reaction mixture showed that only minor amounts of carbon monoxide and carbon dioxide were formed and that the yield of p-(alpha,alpha-dimethylbenzyl) phenol was about 11% as calculated on the oxygen consumed. Approximately 50% of the hydrogen bromide was recovered as such.

*Example VI*

A vaporous mixture consisting of about 2 parts by volume of xylenes, 2 parts by volume of oxygen and 1 part by volume of hydrogen bromide was conveyed through a Pyrex glass reaction coil at substantially atmospheric pressure and at such a rate that the residence time was about three minutes. The temperature in the coil was maintained at about 195° C. An analysis of the reaction mixture showed that the total yield of carboxylic acids was about 32.0% as calculated on the oxygen consumed, the yield of phenolic compounds being about 24.0%. Approximately 83% of the hydrogen bromide was recovered as such.

In all of the above cases it would be impossible to effect any oxidation if the reactions were attempted under like conditions but in the absence of hydrogen bromide.

The organic bromides formed as a result of side reactions between the starting organic material and the hydrogen bromide catalyst may be treated according to the process of the invention to produce added amounts of the desired oxygenated products. Simultaneously, such reaction forms hydrogen bromide so that at least a portion of the hydrogen bromide originally employed as the catalyst is thus regenerated and may be re-used.

We claim as our invention:

1. A process for the controlled oxidation of alkylated aromatic hydrocarbons to form organic oxygenated products comprising subjecting the vapors of an alkylated aromatic compound wherein the alkyl substituents on the aromatic nucleus are members chosen from the group consisting of lower normal alkyl radicals and lower iso alkyl radicals, to the action of oxygen and an effective amount of hydrogen bromide at a temperature of between about 100° C. and the spontaneous combustion temperature of the mixture.

2. The process of claim 1 wherein an inert diluent is present in the vaporous reaction mixture.

3. A process for the controlled oxidation of an organic compound, said organic compound consisting of a benzene nucleus having attached thereto at least one substituent selected from the group consisting of lower normal alkyl radicals and lower iso alkyl radicals comprising subjecting the vapors of said compound to oxygen and an effective amount of hydrogen bromide at a temperature of between about 100° C. and the spontaneous combustion temperature of the mixture.

4. A process for the production of phenolic compounds, acetophenone and carboxylic acids which comprises oxidizing a vaporous mixture containing ethyl benzene, oxygen and from about 14 to about 20 mole percent of hydrogen bromide at a temperature of between about 100° C. and the spontaneous combustion temperature of the mixture.

5. A process for the production of phenolic compounds comprising oxidizing a vaporous mixture containing ethyl benzene, oxygen and from about 14 to about 20 mole percent of hydrogen bromide at a temperature of between 100° C. and the spontaneous combustion temperature of the mixture.

6. A process for effecting controlled oxidation to form oxygenated organic compounds comprising oxidizing a vaporous mixture containing toluene, oxygen and from about 14 to about 20 mole percent of hydrogen bromide at a temperature of between 100° C. and the spontaneous combustion temperature of the mixture.

7. A process for the production of phenolic compounds, acetophenone and carboxylic acids which comprises oxidizing a vaporous mixture containing ethyl benzene, oxygen and from about 14 to about 20 mole percent of hydrogen bromide at a temperature of between about 100° C. and the spontaneous combustion temperature of the mixture, and recovering phenolic compounds, acetophenone and carboxylic acids from the reaction mixture thus formed.

8. A process for the production of phenolic compounds comprising oxidizing a vaporous mixture containing ethyl benzene, oxygen and from about 14 to about 20 mole percent of hydrogen bromide at a temperature of between 100° C. and the spontaneous combustion temperature of the mixture, and recovering phenolic compounds from the reaction mixture thus formed.

9. A process for effecting controlled oxidation to form oxygenated organic compounds comprising oxidizing a vaporous mixture containing toluene, oxygen and from about 14 to about 20 mole percent of hydrogen bromide at a temperature of between 100° C. and the spontaneous combustion temperature of the mixture, and recovering oxygenated organic compounds from the reaction mixture thus formed.

FREDERICK F. RUST.
WILLIAM E. VAUGHAN.

REFERENCES CITED

The following references are of record in the file of this patent:

UNITED STATES PATENTS

| Number | Name | Date |
|---|---|---|
| 1,924,763 | Carpenter | Aug. 29, 1933 |
| 1,924,767 | Carpenter | Aug. 29, 1933 |
| 1,895,799 | James | Jan. 31, 1933 |
| 2,197,101 | Eaglesfield | Apr. 16, 1940 |
| 2,199,585 | Bone | May 7, 1940 |

FOREIGN PATENTS

| Number | Country | Date |
|---|---|---|
| 676,826 | French | Feb. 27, 1930 |